Oct. 16, 1928.  1,687,812
C. WEBER
PORTABLE CHAIR CARRIER
Filed Aug. 15, 1927   2 Sheets-Sheet 1
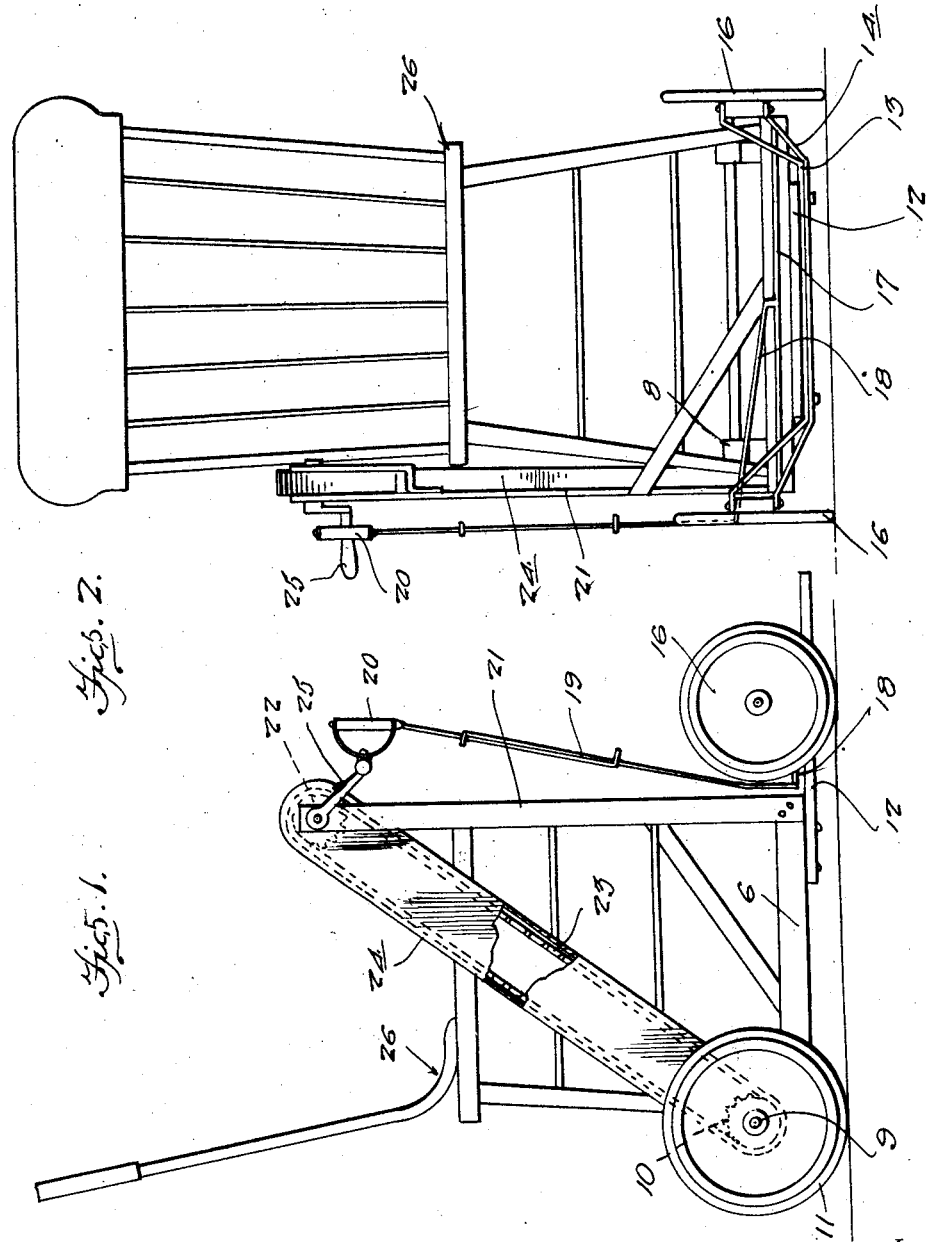
Inventor
Christian Weber
By Clarence A. O'Brien
Attorney Oct. 16, 1928. 1,687,812
C. WEBER
PORTABLE CHAIR CARRIER
Filed Aug. 15, 1927 2 Sheets-Sheet 2
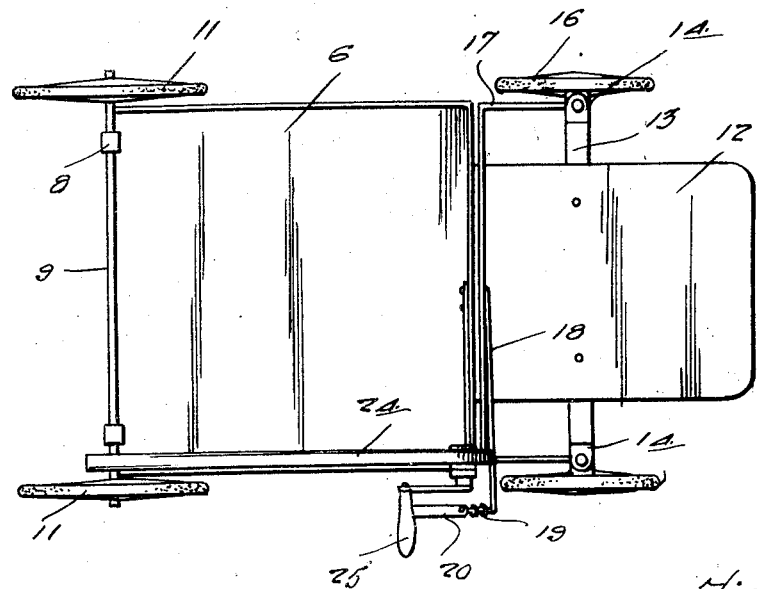
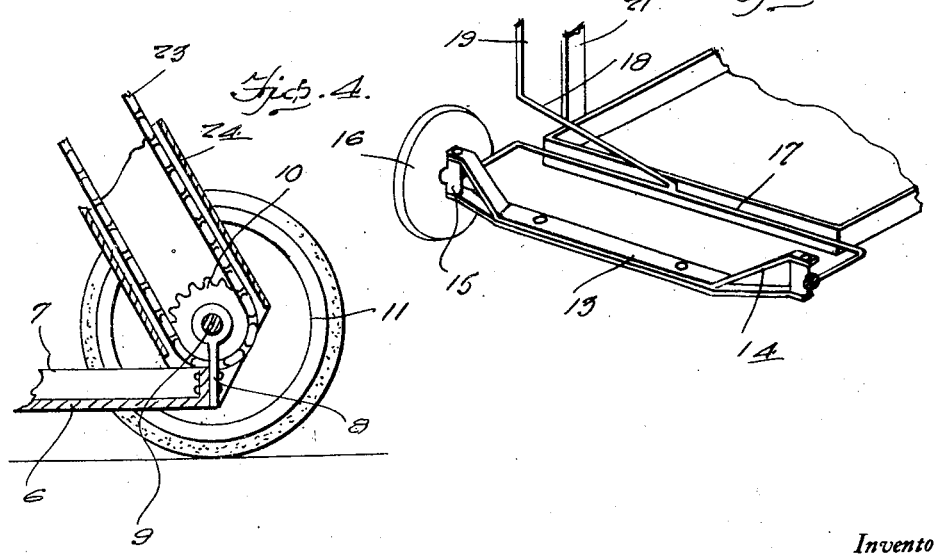
Inventor
Christian Weber
By Clarence A. O'Brien
Attorney.

Patented Oct. 16, 1928.

1,687,812

UNITED STATES PATENT OFFICE.

CHRISTIAN WEBER, OF STOCKTON, CALIFORNIA.

PORTABLE CHAIR CARRIER.

Application filed August 15, 1927. Serial No. 213,098.

This invention relates to an improved portable chair carrier, adapted for use more particularly by invalids.

Briefly, the invention has reference to a wheel supported base constructed to accommodate an ordinary household chair, a manually propelled sprocket drive, and steering means located within convenient reach of the occupant, whereby to permit the carrier to be propelled and guided about.

The novelty resides in the new arrangement of parts serving to produce an efficient carrier for an ordinary household chair, and such novelty will become more readily apparent from the adjoined claims, and following the detailed description.

In the drawings:—

Figure 1 is a side view of the carrier showing the chair in place.

Fig. 2 is a front view of the same.

Fig. 3 is a top plan view of the carrier with the chair removed.

Fig. 4 is an enlarged fragmentary sectional and elevational view showing the sprocket drive.

Fig. 5 is likewise a fragmentary perspective view showing the steering mechanism more in detail.

In the drawings, the reference character 6 designates a base plate which is provided with an upstanding marginal rim 7. Fastened to the rear portion of the rim is a pair of brackets 8 having bearings accommodating a rotary driving shaft 9. Mounted on the end portions of the shaft are sprocket wheels 10 and surface engaging wheels 11, preferably rubber tired.

Fastened to the under side of the front of the base plate, is a shelf-like extension 12 which constitutes a platform and a means for mounting the front steering wheels. Incidentally, a pair of superposed strips 13 are riveted to the under side of the extension and extend beyond the ends thereof and are provided with yokes 14 accommodating knuckles 14 carrying the front steering wheels 16.

A substantially U-shaped steering rod 17 has it end portions connected with the knuckles in a somewhat conventional manner. Connected to and rising from the bight portion of the rod 17 is a steering shaft 18 including an extensible vertical portion 19 having a hand grip 20 at its top located within convenient reach of the operator.

An upright 21 of suitable construction is fastened to one corner of the base plate and extends to a suitable elevation and carries the stub shaft on which a complemental sprocket wheel 22 is mounted. A sprocket chain 23 is trained over the sprocket wheels and is operable in a protective housing 24 of suitable design.

The stub shaft carries a hand crank 25, also located within convenient reach of the occupant. In practice, an ordinary household chair 26 is placed in the pan-like space, thus rendering the steering means and driving means readily available to the occupant. Obviously by turning the hand crank 25, the sprocket drive serves to impart rotation to the aforesaid shaft 9 and consequently to the driving and surface engaging wheels 11. Thus, the device is propelled about.

The hand grip 20 is adjusted to a suitable elevation and the device is thereby easily steered. A device of the type described is particularly useful in hospitals, as well as in homes by invalids. It is easy to operate, efficient in operation and is particularly advantageous in that it serves to accommodate a readily available ordinary household chair. The advantages derived from a structure of this kind will be quite clear to persons skilled in the art to which the invention relates, for which reason, a more lengthy description is thought unnecessary.

It is understood, of course, that the novelty is predicated upon the broad arrangement of parts and these may be varied in shape and proportions to accommodate different types of chairs. In fact, such variations as may be required can be resorted to within the field of invention claimed.

Having thus described my invention, what I claim as new is:—

1. In a structure of the class described, a supporting base for a chair, bearing brackets carried by said base, a shaft mounted for rotation upon the bearing brackets, driving wheels on said shaft, a platform carried by said base, steering wheels mounted on said platform, an operating device for the driving wheels located at a point spaced above said base, and an adjustable control device for the steering wheels.

2. In a structure of the class described, a base provided with an upstanding marginal rim, said base serving to accommodate an ordinary household chair, brackets carried by said base, a shaft mounted for rotation upon said brackets, wheels carried by said shaft, an upright rising from the forward portion of said base, an operating device on the upper end of the upright, a driving connection between said operating device and said shaft, steering wheels mounted in advance of said base, and a manual control device for said steering wheels.

3. In a structure of the class described, a base provided with an upstanding marginal rim, brackets carried by said rim, said brackets being formed with bearings, an axle mounted for rotation in said bearings, driving wheels carried by said axle, a sprocket wheel also carried by said axle, an extension plate fastened to the under side of the said base and projecting forwardly therefrom, and forming a platform, steering wheels supported from said platform, a control device for said steering wheels, an upright rising from the forward portion of said base, a stub shaft mounted for rotation in a bearing at the upper end of said upright, a crank for operating said stub shaft, a sprocket wheel carried by said stub shaft, a sprocket chain trained over said sprocket wheels, and a casing for said chain and sprocket wheels.

4. In a structure of the class described, a base provided with an upstanding marginal rim, brackets carried by said rim, said brackets being formed with bearings, an axle mounted for rotation in said bearings, driving wheels carried by said axle, a plate fastened to the under side of the said base and projecting forwardly therefrom and forming a platform, steering wheels supported from said extension plate, a control device for said steering wheels, an upright rising from the forward portion of said base, a stub shaft mounted for rotation in a bearing at the upper end of said upright, a hand crank for operating said stub shaft, a sprocket wheel carried by said stub shaft, a sprocket chain trained over both of said sprocket wheels, a casing for said chain and sprocket wheels, said control device embodying an extensible hand grip.

In testimony whereof I affix my signature.

CHRISTIAN WEBER.